United States Patent
Liao et al.

(10) Patent No.: US 12,175,468 B2
(45) Date of Patent: Dec. 24, 2024

(54) MODEL-BASED CHARGEBACK REPRESENTMENT

(71) Applicant: Bolt Financial, Inc., San Francisco, CA (US)

(72) Inventors: Yangdong Liao, San Mateo, CA (US); Zachary A. Barnes, San Diego, CA (US)

(73) Assignee: Bolt Financial, Inc., San Francisco, CA (US)

( * ) Notice: Subject to any disclaimer, the term of this patent is extended or adjusted under 35 U.S.C. 154(b) by 57 days.

(21) Appl. No.: 17/348,517

(22) Filed: Jun. 15, 2021

(65) Prior Publication Data

US 2021/0390550 A1 Dec. 16, 2021

Related U.S. Application Data

(60) Provisional application No. 63/039,313, filed on Jun. 15, 2020.

(51) Int. Cl.
| | |
|---|---|
| *G06Q 20/40* | (2012.01) |
| *G06N 5/04* | (2023.01) |
| *G06N 20/00* | (2019.01) |
| *H04L 9/40* | (2022.01) |

(52) U.S. Cl.
CPC ........... *G06Q 20/4016* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2013/0311369 | A1* | 11/2013 | Elrod | G06Q 40/02 705/44 |
| 2017/0286962 | A1* | 10/2017 | Lai | G06Q 20/4016 |
| 2021/0334812 | A1* | 10/2021 | Ur | G06Q 30/0201 |

OTHER PUBLICATIONS

Characterizing and preventing chargebacks in next generation web payments services, IEEE (Year: 2012).*
Fraud Analysis and Prevention in e-Commerce Transactions, IEEE (Year: 2014).*

* cited by examiner

*Primary Examiner* — Bruce I Ebersman
*Assistant Examiner* — Bhavin D Shah
(74) *Attorney, Agent, or Firm* — Baker Botts L.L.P.

(57) ABSTRACT

In one embodiment, a method for conducting a model-based chargeback representment includes acquiring, by a transaction processing system, a record of a chargeback asserted by a customer against a merchant for a transaction. The method includes determining, by the transaction processing system and using a chargeback representment model, a confidence of asserting chargeback representment for the chargeback, wherein the chargeback representment model is trained to predict the success of a chargeback representment based on analyzing the context and characteristics of a chargeback. The method includes facilitating, by the transaction processing system, chargeback representment for the chargeback for the transaction. The method includes receiving, by the transaction processing system, results of the chargeback representment for the chargeback. The method includes providing, by the transaction processing system, the results of the chargeback representment for the chargeback to the merchant.

9 Claims, 8 Drawing Sheets

MODEL-BASED CHARGEBACK REPRESENTMENT

PRIORITY

This application claims the benefit, under 35 U.S.C. § 119(e), of U.S. Provisional Patent Application No. 63/039,313, filed 15 Jun. 2020, which is incorporated herein by reference.

BACKGROUND

With credit card transactions, card holders can dispute charges with their issuers. Typical reasons may include merchant operational issues (e.g., damaged goods, shipping delays), malicious fraud (e.g., stolen cards), or so-called "friendly fraud" which may include card holders alleging that they did not make the purchase or card holders alleged that shipped goods are missing or were never received. Disputed transactions can turn into chargebacks, at which point the original purchase amount along with an extra processing fee is debited from the merchant and returned to the card holder.

Chargebacks create non-trivial loss for merchants. To mitigate unreasonable cases, card networks provide a process called chargeback representment, letting merchants dispute individual chargebacks and reclaim the returned amount.

SUMMARY OF PARTICULAR EMBODIMENTS

For merchants, assertion of chargeback representments is not always worth the cost. The efforts involved in identifying potential representments for prosecution, actually processing the representment, in addition to potential fees for arbitration may outweigh the potential return. The cost of asserting representment may discourage merchants from challenging likely fraudulent cases and even cases where the subjective likelihood of winning is uncertain. On the other hand, some assertions for representment that appear seemingly unwinnable to the typical observer may actually have high success rates with low effort if it were possible to efficiently and effectively analyze the conditions of the chargeback.

Combining these concerns and motivations, this disclosure contemplates the problem of asserting chargeback representment as an optimization problem. However, given the number of variables and trends involved in chargebacks, it is exceedingly difficult, if not impossible, for humans to adapt and predict the appropriate course of action.

This is the motivation behind a model-based approach, described in particular embodiments herein, in which a machine learning model may continuously receive feedback from banks and other financial institutions and learn the policy for when to assert a representment and when not to assert a representment under each situation. Through this continuous feedback, the model, as described herein, may adapt to trends in the industry and provide statistically correct recommendations in chargeback representment.

Embodiments described herein include systems and methods for facilitating a model-based chargeback representment evaluation and assertion. In particular embodiments, a transaction processing system acquires a record of a chargeback asserted by a customer against a merchant for a transaction. The transaction processing system determines, using a chargeback representment model, a confidence of asserting chargeback representment for the chargeback. The chargeback representment model is trained to predict success of a chargeback representment based on analyzing the context and characteristics of a chargeback. The transaction processing system facilitates chargeback representment for the chargeback for the transaction. The transaction processing system receives results of the chargeback representment for the chargeback. The transaction processing system provides the results of the chargeback representment for the chargeback to the merchant. In particular embodiments, the transaction processing system retrains the chargeback representment model based on the results of the chargeback representment for the chargeback to the merchant. In particular embodiments, facilitating the chargeback representment includes providing, by the transaction processing system to the merchant, a recommendation regarding the chargeback representment, where the recommendation is associated with the confidence of the model regarding the chargeback representment, and receiving, by the transaction processing system from the merchant, a request to initiate the chargeback representment. In particular embodiments, facilitating the chargeback representment includes automatically initiating, by the transaction processing system, the chargeback representment on behalf of the merchant based on the confidence of the model regarding the chargeback representment. In particular embodiments the context and characteristics of the chargeback include one or more of purchase patterns associated with a customer involved in the transaction, characteristics of the customer involved in the transaction, results of one or more verification checks performed by the transaction processing system or a third-party system, a merchant category code of the merchant, a type of goods or services involved in the transaction, a value of the transaction, a provided reason for the chargeback, characteristics of a payment card involved in the transaction, an amount of time between the transaction and chargeback, or merchant evidence related to the transaction. In particular embodiments, the transaction processing system trains the chargeback representment model. The transaction processing system accesses records of chargebacks, including respective context and characteristics of each chargeback. The transaction processing system provides the plurality of records of chargebacks to the chargeback representment model. The transaction processing system predicts, using the chargeback representment model, an outcome of asserting representment for each chargeback in the plurality of records of chargebacks. The transaction processing system predicts, using the chargeback representment model, a relative relevance of the respective context and characteristics of each chargeback. The transaction processing system receives an outcome of a representment associated with one or more of the predicted outcomes. The transaction processing system revises the chargeback representment model based on the received outcome. In particular embodiments the transaction processing system recommends, to the merchant, additional context and characteristics to collect during subsequent transactions.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
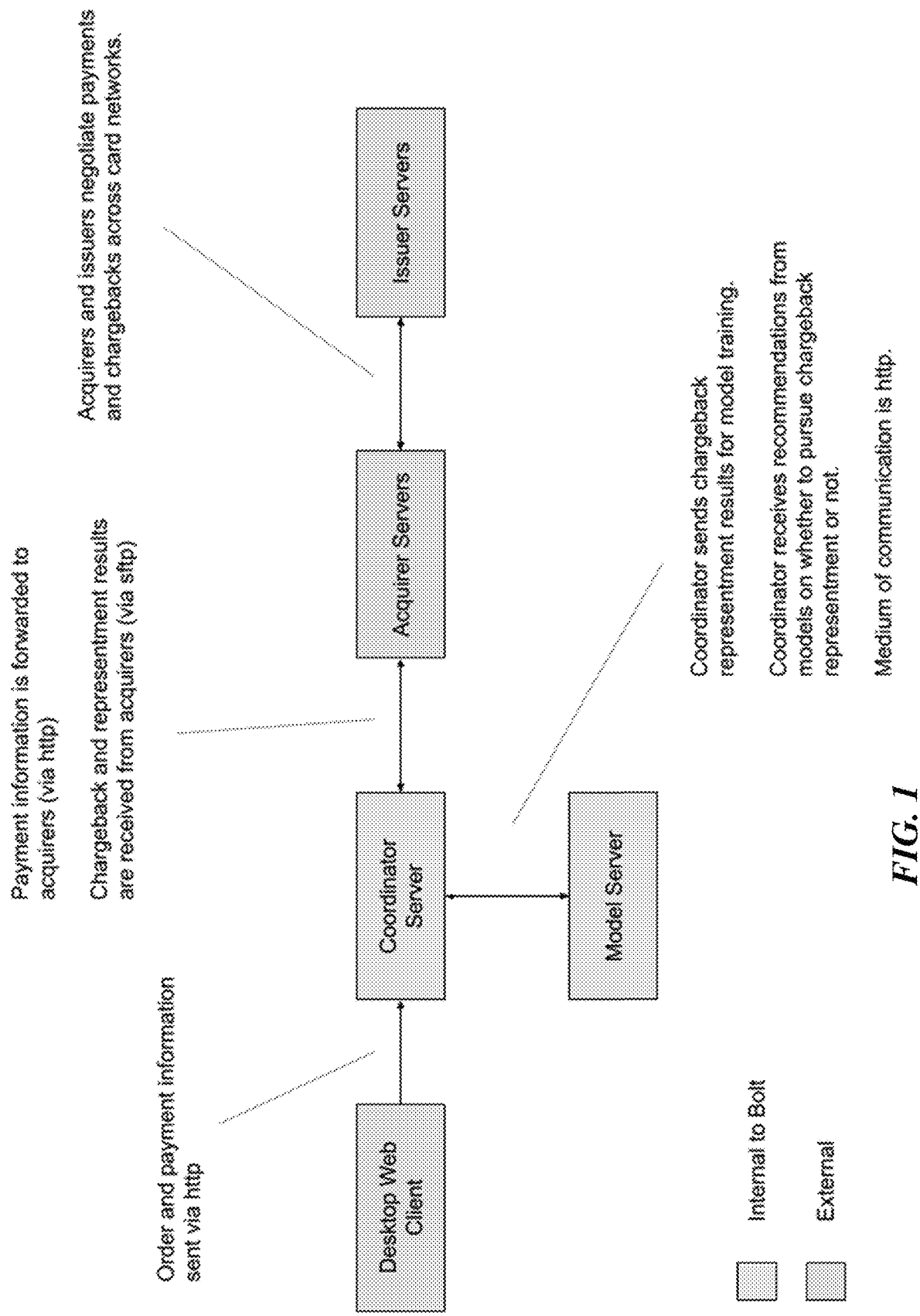
FIG. 1 illustrates an example architecture according to embodiments disclosed herein.

Particular embodiments disclosed herein may be designed to address specific problems or omissions in the current state of the art as described herein. In particular, given a set of chargebacks, one goal of the disclosed embodiments is to recommend action items to the merchant to maximize their expected return and/or to automate one or more steps of the process of asserting a chargeback representment.

Embodiments described herein include systems and methods for facilitating a model-based chargeback representment evaluation and assertion. In particular embodiments, a transaction processing system acquires a record of a chargeback asserted by a customer against a merchant for a transaction. The transaction processing system determines, using a chargeback representment model, a confidence of asserting chargeback representment for the chargeback. The chargeback representment model is trained to predict success of a chargeback representment based on analyzing the context and characteristics of a chargeback. The transaction processing system facilitates chargeback representment for the chargeback for the transaction. The transaction processing system receives results of the chargeback representment for the chargeback. The transaction processing system provides the results of the chargeback representment for the chargeback to the merchant. In particular embodiments, the transaction processing system retrains the chargeback representment model based on the results of the chargeback representment for the chargeback to the merchant. In particular embodiments, facilitating the chargeback representment includes providing, by the transaction processing system to the merchant, a recommendation regarding the chargeback representment, where the recommendation is associated with the confidence of the model regarding the chargeback representment, and receiving, by the transaction processing system from the merchant, a request to initiate the chargeback representment. In particular embodiments, facilitating the chargeback representment includes automatically initiating, by the transaction processing system, the chargeback representment on behalf of the merchant based on the confidence of the model regarding the chargeback representment. In particular embodiments the context and characteristics of the chargeback include one or more of purchase patterns associated with a customer involved in the transaction, characteristics of the customer involved in the transaction, results of one or more verification checks performed by the transaction processing system or a third-party system, a merchant category code of the merchant, a type of goods or services involved in the transaction, a value of the transaction, a provided reason for the chargeback, characteristics of a payment card involved in the transaction, an amount of time between the transaction and chargeback, or merchant evidence related to the transaction. In particular embodiments, the transaction processing system trains the chargeback representment model. The transaction processing system accesses records of chargebacks, including respective context and characteristics of each chargeback. The transaction processing system provides the plurality of records of chargebacks to the chargeback representment model. The transaction processing system predicts, using the chargeback representment model, an outcome of asserting representment for each chargeback in the plurality of records of chargebacks. The transaction processing system predicts, using the chargeback representment model, a relative relevance of the respective context and characteristics of each chargeback. The transaction processing system receives an outcome of a representment associated with one or more of the predicted outcomes. The transaction processing system revises the chargeback representment model based on the received outcome. In particular embodiments the transaction processing system recommends, to the merchant, additional context and characteristics to collect during subsequent transactions.

Particular embodiments disclosed herein may provide one or more of the results, effects, or benefits described herein. As an example only and not by way of limitation, there are many variables and trends involved in deciding whether a merchant should pursue chargeback representment or not. There are also secondary effects to consider such as brand image and deterring repeat behaviors. Taken at the scale of even moderately-sized merchants conducting many transactions daily or weekly, the task of determining how to handle the first-order and secondary effects and trends is too complex for humans to interpret and decipher.

A transaction processing system, which acts to handle the acquisition and processing of transactions placed by customers on behalf of merchants can utilize its unique position in the transaction processing flow to provide computer-based assistance to merchants. A model-based approach, as described with respect to particular embodiments, may determine the action to take in all situations. Changes and trends are common in the industry, a model-based approach with continuous feedback may adapt to changes quickly without necessarily requiring additional investments.

Particular embodiments disclosed herein may be implemented using one or more example architectures. The following description is made principally with reference to FIG. 1.

Coordinator Server: A service internal to a transaction processing system, the Coordinator Server routes payment requests from clients to acquirers. In particular embodiments, the Coordinator Server may also receive chargeback information from acquirers and determine if representment is needed.

Acquirer Servers: The Acquirer Servers represent banks processing payments on behalf of merchants.

Issuer Servers: The Issuer Servers correspond to banks issuing credit cards or other payment cards to consumers.

Card Networks: The Card Networks correspond to communication channels provided by payment processors.

Figure 2:
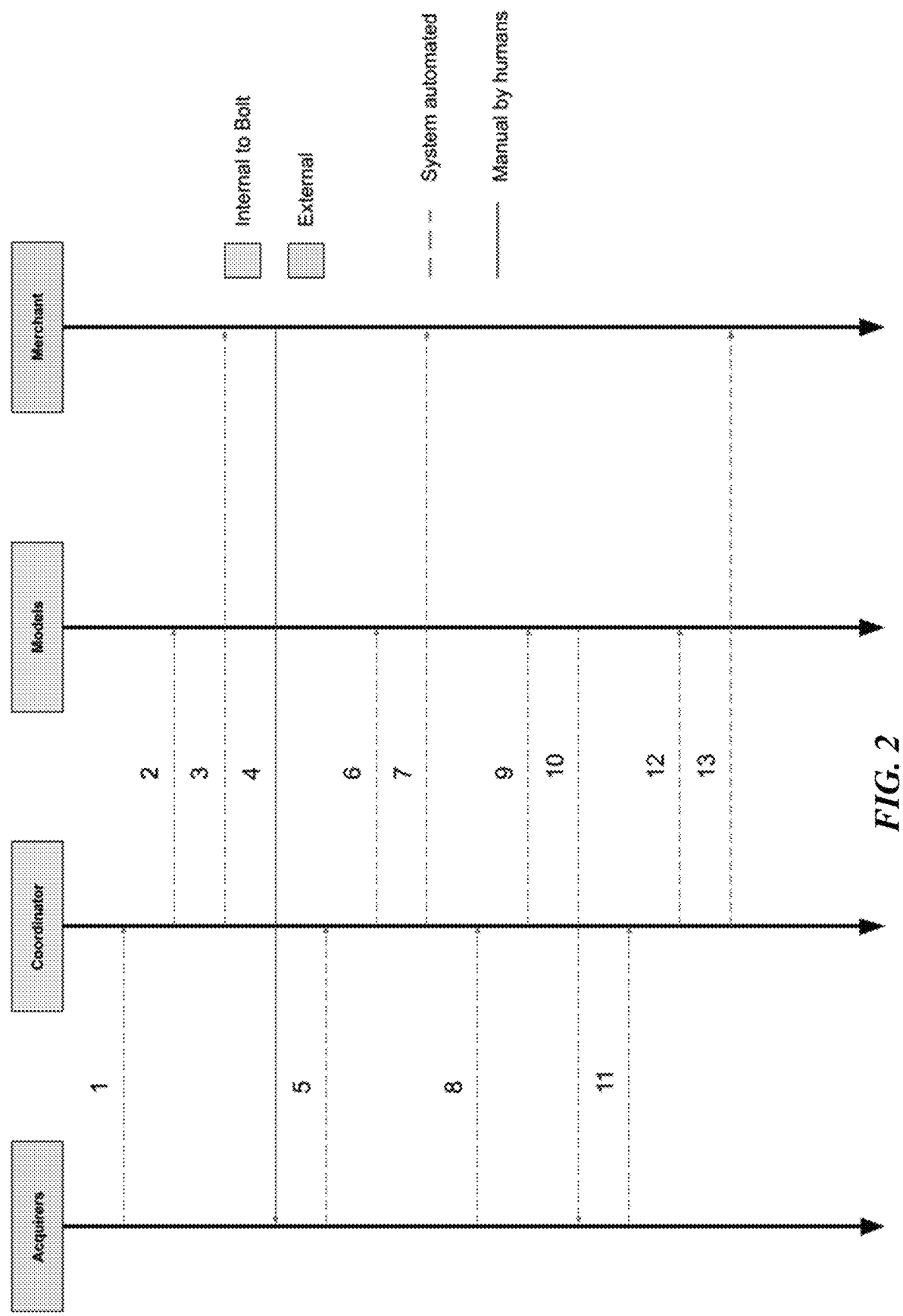
FIG. 2 illustrates an example process according to embodiments disclosed herein.

Particular embodiments disclosed herein may be implemented using one or more example processes. A first example process is described below with reference to FIG. 2.

The process may comprise two related procedures. In a first procedure, Steps 1-7 represent the workflow while the machine learning model (also referenced to as the "model" herein) is untrained and result in training of the model. In step 1, The Coordinator receives records of chargeback cases from Acquirers. In step 2, the Coordinator queries the model to determine if chargeback representment should be pursued. At this time, because the model is not fully trained, the model may not have received enough training data, in which case, no recommendation may be given. In step 3, the Coordinator notifies the Merchant of receipt of a chargeback case. In step 4, the Merchant may initiate representation manually. In step 5, once representment outcomes are available (e.g., from the manual representment initiated by the Merchant), they are ingested by the Coordinator. In step 6, the Coordinator notifies the model of the details of the chargeback and representment as well as the results. The model is subsequently updated based on the results. In step 7, the Coordinator may notify the Merchant of the results. Thus, the model is trained in a feedback loop wherein the results of representment assertions are compared to predictions of representment results, and the model is subsequently updated based on both Merchant actions (learning from and improving upon the Merchant behavior) and realized outcomes. The learning process can be a generally unsupervised manner, where the model is permitted to identify the connections and trends in representment results on its own, absent the influence of human actors. In certain embodiments, the learning process can be at least initially begun with attempting to capture human intuition, further improving on previous techniques.

The model can be trained on a variety of data obtained from acquirers regard transactions, chargebacks, and attempted (and successfully) representments. The features include, but at not limited to:

A Buyer's previous purchase patterns
Characteristics of the buyer involved in the transaction
Address Verification System (AVS) results
Card Verification Value (CVV) results
Merchant Category Code (MCC)
Goods sold
A chargeback reason code
Transaction amount
Payment card details (e.g., card network, debit/credit, card use type, card classification, etc.)
Time between purchase and chargeback
Merchant's historical "win" rate on representment
Merchant evidence available (e.g., delivery confirmation, shipment tracking, prior user purchase history, etc.)

The characteristics of the buyer (e.g., customer) involved in the transaction can include, by way of example only and not limitation, a unique identifier for the user, contact information for the user (e.g., email address, phone number), an identifier for the device of the customer (e.g., from which the customer is engaging with the merchant), etc.

This process may repeat until the model's performance reaches a sufficient level of performance. The model's performance may be assessed for example based on comparison of accuracy of predicted outcomes compared to actual outcomes for a variety of scenarios (e.g., type of chargeback, type of industry, value of the chargeback, etc.). The model's performance may also be evaluated more subjectively, e.g., based on a comparison of outcomes where the model suggested no representment but the merchant initiated and had a negative outcome.

Once the model is ready, the workflow may enter a second procedure demonstrated in steps 8-13. In step 8, the Coordinator may receive chargeback cases from Acquirers. As in step 1, the records received with the chargeback cases can include a variety of data useful for processing the chargeback and evaluating for representment. In step 9, the Coordinator may request a strategy for responding to the chargeback cases from the model. The strategy can be determined by the model based on the training and trends identified in the training data. The strategy can also be associated with a measure of confidence, generated by the model, and presented to the Coordinator. The strategy can include a prediction and/or ranking of relevance of the available evidence. In step 10, with confidence in the strategy, the Coordinator bypasses the Merchant and performs chargeback representment automatically on the Merchant's behalf. In step 11, once representment outcomes are available, they may be ingested by the Coordinator. In step 12, the Coordinator may notify the model of the results. The model may be subsequently updated based on the results and recommended strategy. In step 13, the Coordinator may notify the Merchant of the results.

Particular embodiments may repeat one or more steps of the example process(es), where appropriate. Although this disclosure describes and illustrates particular steps of the example process(es) as occurring in a particular order, this disclosure contemplates any suitable steps of the example process(es) occurring in any suitable order. Moreover, although this disclosure describes and illustrates an example process, this disclosure contemplates any suitable process including any suitable steps, which may include all, some, or none of the steps of the example process(es), where appropriate. Furthermore, although this disclosure describes and illustrates particular components, devices, or systems carrying out particular steps of the example process(es), this disclosure contemplates any suitable combination of any suitable components, devices, or systems carrying out any suitable steps of the example process(es).

Particular embodiments disclosed herein may be implemented in relation to different example use cases.

As an example, chargeback representment may lead to recovery of loss payments, however the process itself also incurs cost (e.g., time spent, arbitration fees from bank, etc.). Using a predictive model to estimate the success rate, the automated representment system can calculate the expected return from fighting a chargeback and use that as a basis to maximize return. This benefits the merchant overall and uses real outcomes as a measure of the training procedure.

As another example, the model-based chargeback representment can actively determine so-call friendly fraud. The determination of friendly fraud can be used by merchants to selectively determine which customers are permitted to make purchases or apply added scrutiny to orders placed by customers who are suspected, by the model, of being repeat offenders. Fraudulent chargebacks that are easily won are typically friendly frauds. These are situations in which the cardholders themselves placed the order, received the goods, and pretended that their cards were stolen in order to defraud the seller. Using the models trained, merchants may retroactively send their historical chargebacks to the models to detect friendly frauds. Once these users are identified, follow-up measures such as blacklisting or freezing an account can be taken.

As another example, the model can be used to determine what evidence is most useful in asserting representment and predict, using identified evidence, the relative relevance of the respective evidence. The model can further cause the transaction processing system or merchant to actively acquire this evidence, or recommend acquiring the evidence, during future transactions. Because the model's features include available evidence, the automated representment may run multiple simulations by asking the model for the probability of success assuming particular evidence is available (e.g., Evidence "X", "Y" or "Z") and predicting the relevance of the evidence (e.g., relevance of the evidence to the resolution of a representment assertion). These simulations may be used to reduce operational cost. For example, if having Evidence X leads to a 95% success rate, whereas having Evidence Y and Z leads to a 90% success rate, a recommendation may be for the merchant to provide just the one piece of Evidence X.

Underlying foundational concepts and terms of art relied upon may relate to one or more of the following:

A transaction processing system platform, such as the Bolt Platform can consist of four conceptual parts. The frontend that serves both the main consumer checkout flow as well as internal and external dashboards and administrative tools. The core services that power the checkout flow as well as fraud detection and payments. Bolt is architected as a set of independent services which communicate to each other via HyperText Transfer Protocol Representational State Transfer ("HTTP REST") or AMAZON Web Services Simple Queue Service ("AWS SQS") messages. The Bolt Application Programming Interface ("Bolt API"), which is the primary means by which merchant systems interface with Bolt, exposed to the outside world via HTTPS REST. Plugins, which are deployed to merchant systems and which connect these systems with the Bolt API.

Other foundational concepts and terms of art may relate to one or more of the following:

Processor integrations to automate chargeback handling (syncing, representation)

A regression model to predict chance of winning a representment. From the regression model the system may derive the expected value.

A classification model to recommend action items to the merchant. Example action items including fighting chargebacks or not or what is the most valuable evidence.

Merchant integration to potentially generate evidence automatically. Evidence may include:
AVS results
CVV results
Billing/shipping addresses
Historical orders
Shipment receipt
Tracking details
Third party data on the user In all example embodiments described herein, appropriate options, features, and system components may be provided to enable collection, storing, transmission, information security measures (e.g., encryption, authentication/authorization mechanisms), anonymization, pseudonymization, isolation, and aggregation of information in compliance with applicable laws, regulations, and rules. In all example embodiments described herein, appropriate options, features, and system components may be provided to enable protection of privacy for a specific individual, including by way of example and not limitation, generating a report regarding what personal information is being or has been collected and how it is being or will be used, enabling deletion or erasure of any personal information collected, and/or enabling control over the purpose for which any personal information collected is used.

The frontend of the Bolt Platform is stored in a monorepo. It consists of the following sub-components:
"Connect.js"—renders the Bolt checkout button and bootstrap iframe for checkout
"checkout"—which is the user-facing component for checkout experience
"Merchant"—which is the merchant facing dashboard
"Admin"—which is the internal dashboard used by risk analysts, merchant success, and engineering The core services and the APIs are stored in a monorepo. Examples of services include:
"API"—which is the set of APIs that power the checkout flow
"adminapi"—which is the set of APIs that power the admin dashboard.
"apihooks"—which sends webhook messages to merchant's shopping platforms
"AsyncJobs"—which is the job framework to handle long-running asynchronous operations
"Notifier"—which sends notifications such as emails and short message service ("SMS") messages
"Imageproxy"—which is a lightweight proxy to serve images Backend services may be written in go (with some machine-learning ("ML") logic in python used for risk modeling). Frontend components may be written in React/Typescript. Data may be stored in Postgres, hosted by a relational database service (RDS). Another database used for state management may be Redis.

"Tokenizer" is a completely separate service, available in a serverless way to handle card tokenization. Tokenizer may be maintained completely separate do payment card industry security standards. Tokenizer may be made available in a serverless way, for example, through a service such as AMAZON Lambda. The tokenizer may be implemented in Typescript, powered by a postgres DB. All of the tokenizer infrastructure may be maintained by a separate provider account, with access restricted to a few people.

Below are more details about key services and technology components.

| Service/Component | Purpose/Functionality | Frameworks/Languages |
| --- | --- | --- |
| API | All communication with 3p services, front end code, business logic | Golang |
| Connect.js and iFrame | Connect.js used for rendering checkout button, entry point for merchants IFrame is how we host checkout form, secure communication with API | React Typescript Webpack |
| checkout frontend | Components used to collect user information during checkout | React Redux Webpack Typescript |
| Notifier | Microservice for enqueueing and sending email and SMS notifications to consumers and merchants. | Golang SQS MAILGUN TWILIO |
| Account.js and iFrame | Used for BigCommerce account dashboard-also uses an Iftame to display data | React Redux Webpack Typescript |
| Shopping Dashboard | Features added to above Account.js | React Redux Webpack Typescript |
| Asynchronous jobs | Heavy lifting of job logic to perform tasks like funding, risk review, etc | Golang Redis Machinery |
| Apihooks (i.e Webhooks) | Microservice for enqueueing and sending webhook events to merchant platforms. | Golang SQS |
| Payment jobs | Scheduler for Asyncjobs framework | Golang Machinery Redis |
| Search | service to index transactions for merchant dashboard | Golang Elastic Search |
| Tokenizer | PCI compliant serverless lambda to store | Node.js AWS Lambda |

-continued

| Service/Component | Purpose/Functionality | Frameworks/Languages |
|---|---|---|
| | credit card information. Used to proxy information to 3rd parties | AWS Key Management Service ("KWS") AWS RDS |
| Gatekeeper/A/B experimentation | Experimentation and feature rollout platform | Typescript AWS Simple Storage Service ("S3") AWS CLOUDFRONT |
| Sleet | Provides a standardized wrapper for implementing many payment processor gateways. | Golang |
| Risk pipeline | Modeling training and model serving | Golang Python SAGEMAKER |
| Track.js and iFrame | Used to track customer behavior when they land on merchant's page. Used for risk signals | Typescript React |
| Ledger | Double write bookkeeping service for funds. Tracks money movements through the system | Golang |
| Chargeback management | Automated system to pull chargeback information from various payment processors and display to merchants in the merchant dashboard chargeback portal | Golang React Typescript |
| Reporting and Reconciliation | Reports pulled from Vantiv and asyncjob with the ledger to ensure fee collection | Golang Asyncjobs AWS S3 |
| Merchant Dashboard | Centralized dashboard for all actions and reporting related to a merchant's management of their Bolt system. | GraphQL React Typescript |
| Admin Dashboard | Centralized dashboard for all internal actions related to managing Bolt merchants. | GraphQL React JavaScript |
| Admin API | API for actions done by Bolt internal employees (onboarding merchants, turning on features) and majority of use is for risk review | Goland GraphQL |

Integration with ecommerce platforms is supported in two ways. First, directly via the API. Second, with plugins deployed to the host instance.

Database: Data is stored in highly available postgres databases backed by AWS RDS. Databases can scale their components within available limits for disk (up to 16 TB), CPU/ram/network (db.x1e.32xlarge which is 64 cpu and 3,904 TB RAM).

Messaging: Both Consumer and Merchant-facing components do messaging through our Notifier Service.

Data Access: Services communicate via REST. GraphQL is used pervasively for all non-external endpoints.

Data Warehouse: A cloud data warehousing service may service as the main data warehouse that stores the refined data. AMAZON ELASTIC MAPREDUCE may be used for extract, transform, load ("ETL") workflows and general analysis of the raw data. AWS Step functions, triggered by a cloud watch event, and AWS Lambda may be used to run the ETL workflows. Results may be loaded into the data warehouse. Code such as ETL scripts may be separately managed. Data consumers (e.g. analysts who look at checkout events) use may use plugins to run queries.

Hosting model: The systems may run on highly available containerized backend services backed, for example, by DOCKER and KUBERNETES on AWS. The backend services may be scaled up/down with zero downtime. Infrastructure for serving the frontend code is highly available and backed by AWS. Frontend serving automatically scales with traffic load.

Logging: Frontend (Bolt checkout modal) logs are sent to an error monitoring and reporting tool. All backend applications (e.g., api, paymentjobs, asyncjobs, notifier, etc.) and infrastructure logs (e.g., kubernetes, AWS) are sent to a cloud monitoring platform. Logs may be archived for long-term storage.

Monitoring: High and low level monitors exist to notify engineers of issues.

Monitors are replicated to non-production environments to ensure issues can be caught before they make it to production. Monitors are managed in code to ensure consistency and to track changes. Overall application service-level agreements (SLAs) are measured, and lower level monitoring of metrics and logs may be performed using a cloud monitoring platform.

Figure 3:
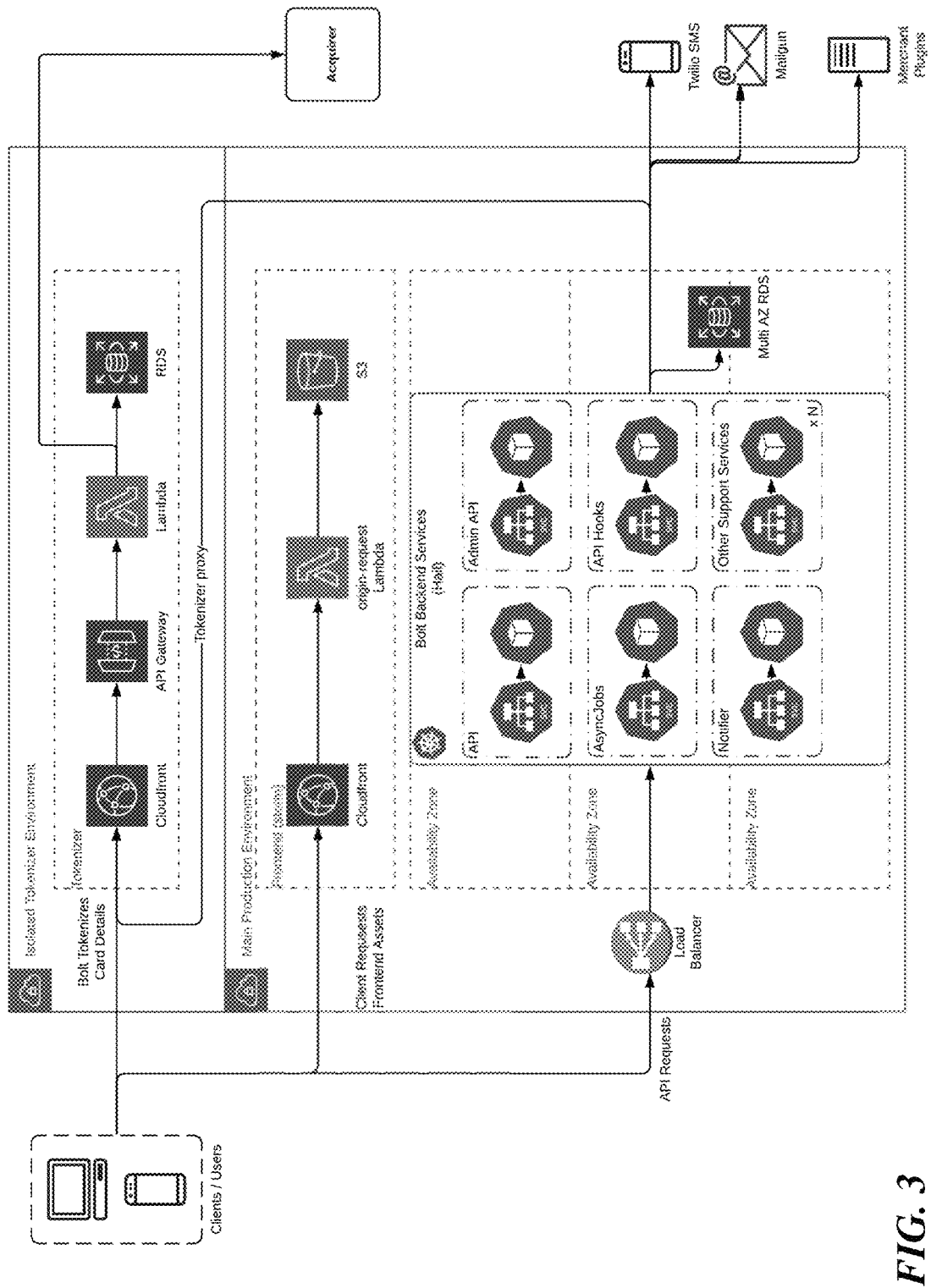
FIG. 3 illustrates an example architecture of a platform according to embodiments disclosed herein.

FIG. 3 highlights the physical architecture of the platform.

Figure 4:
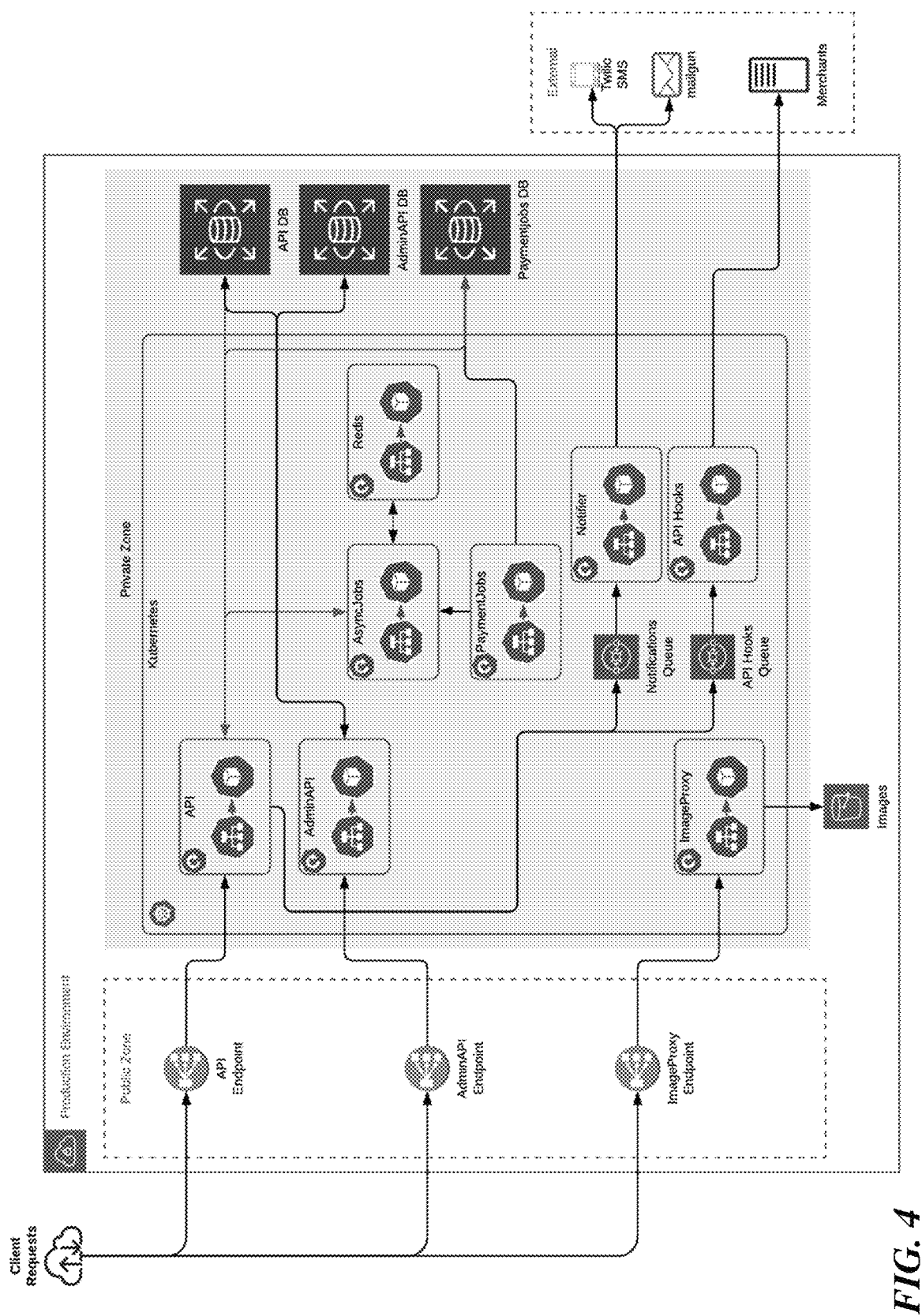
FIG. 4 illustrates an example architecture of a platform according to embodiments disclosed herein.

FIG. 4 shows an alternate visualization of the platform, focusing on backend services.

Figure 5:
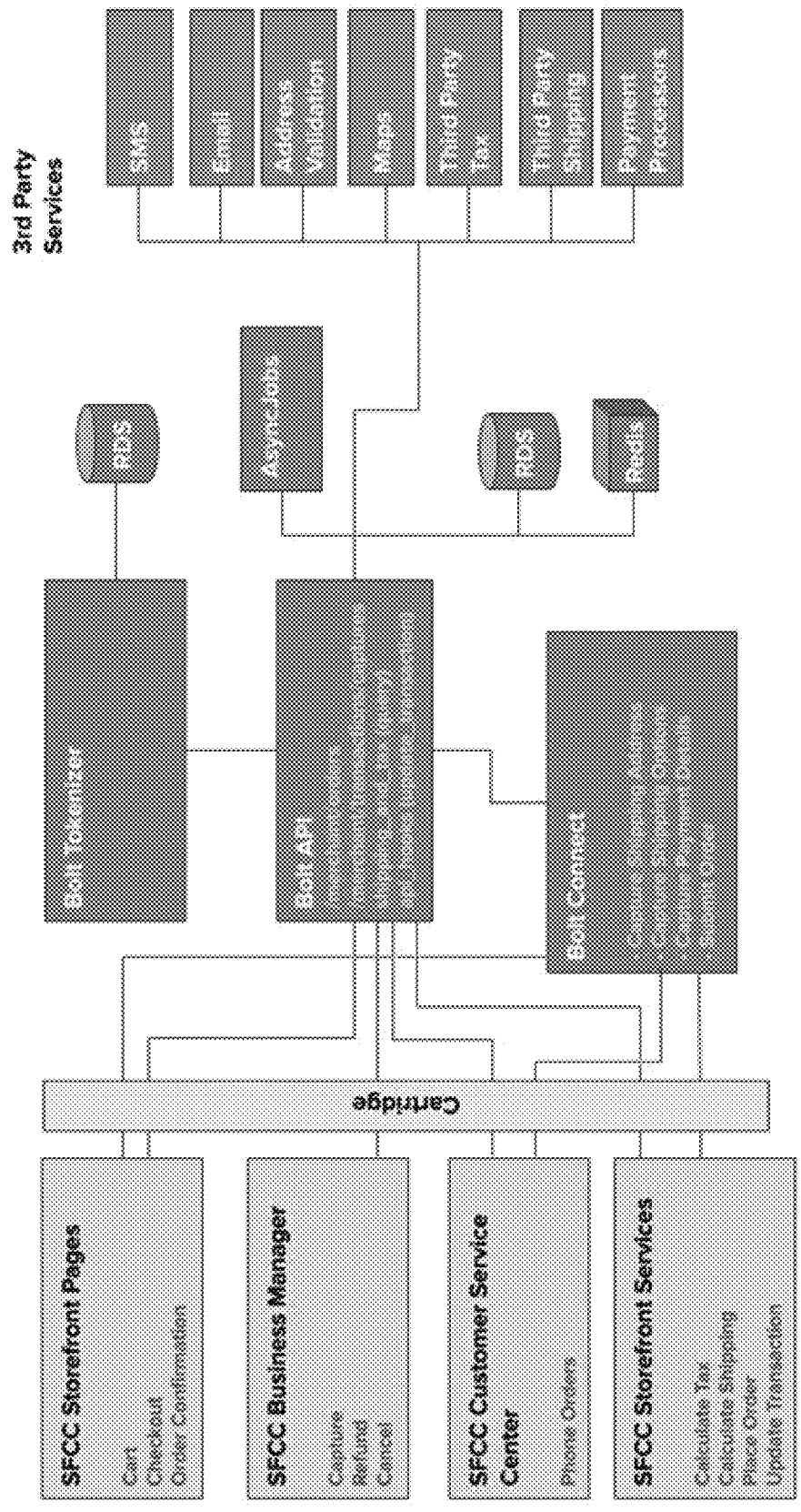
FIG. 5 illustrates example integrations with third party platforms.

FIG. 5 is helpful in understanding how the platform connects with a third party ecommerce platform.

Figure 6:
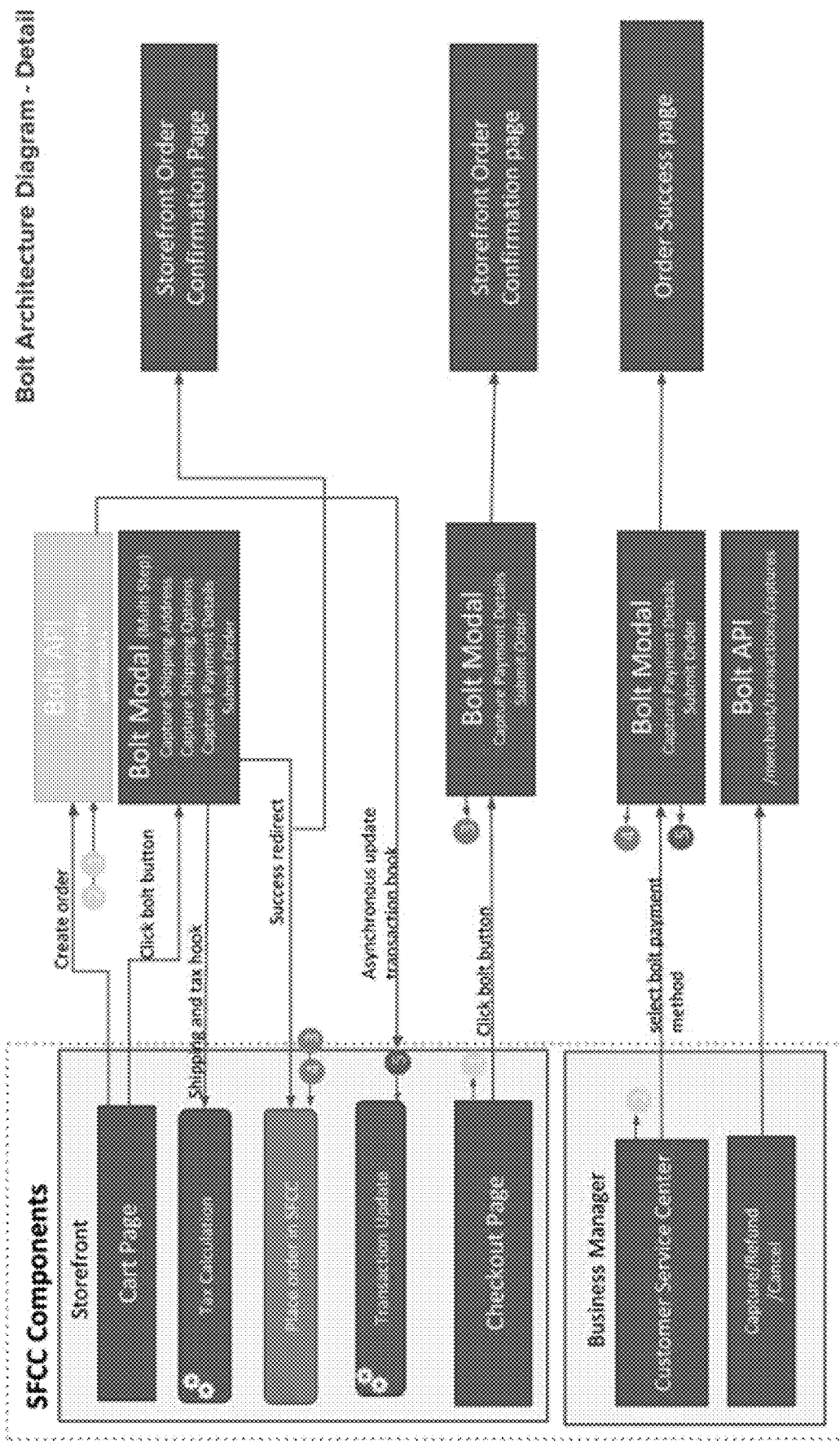
FIG. 6 illustrates example information flows between the platform and a third party platform.

FIG. 6 dives a layer deeper and illustrates the information flows between the platform and a third party platform.

Figure 7:
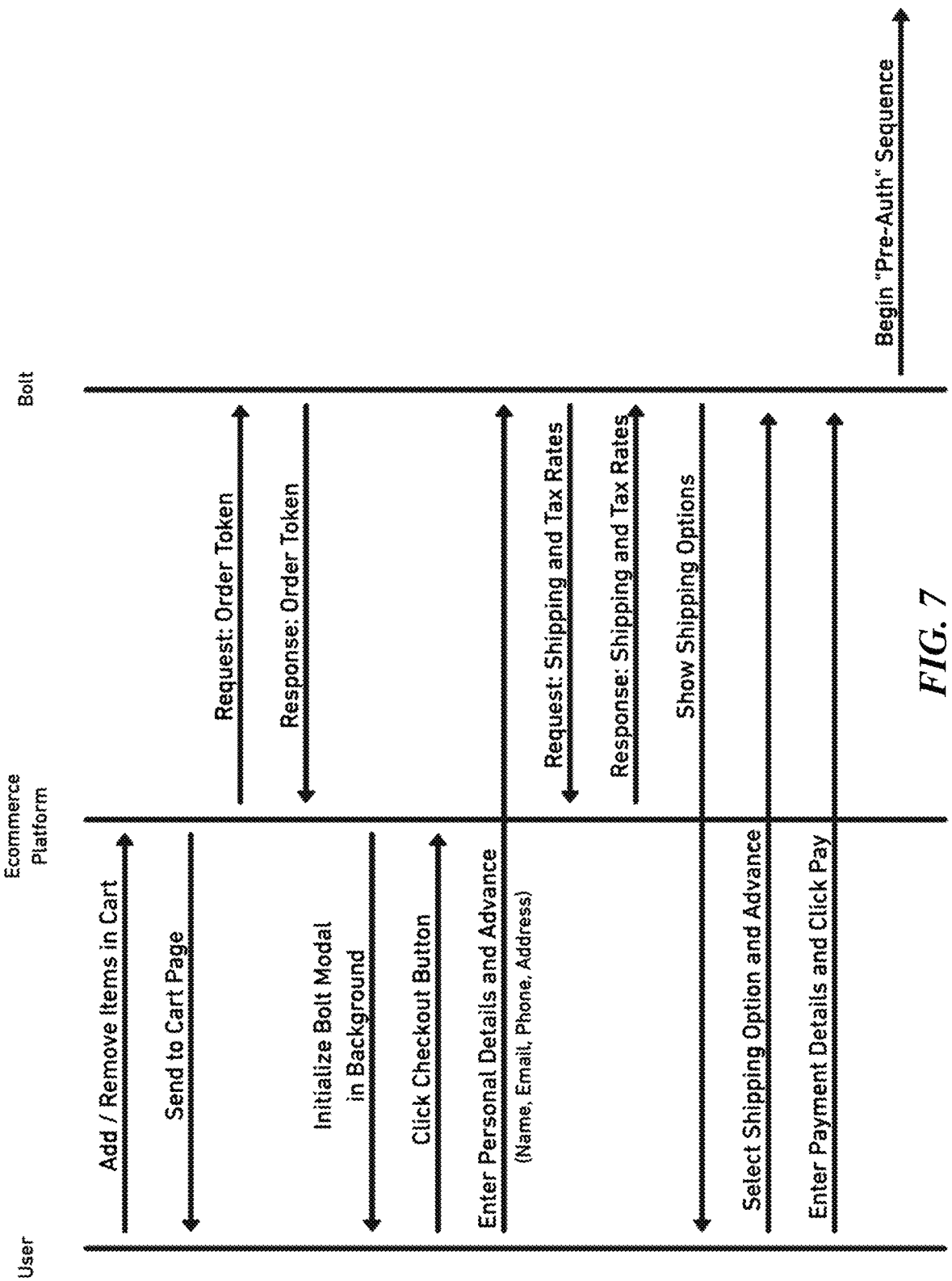
FIG. 7 illustrates the lifecycle of a purchase order.

FIG. 7 illustrates the lifecycle of a purchase order.

Figure 8:
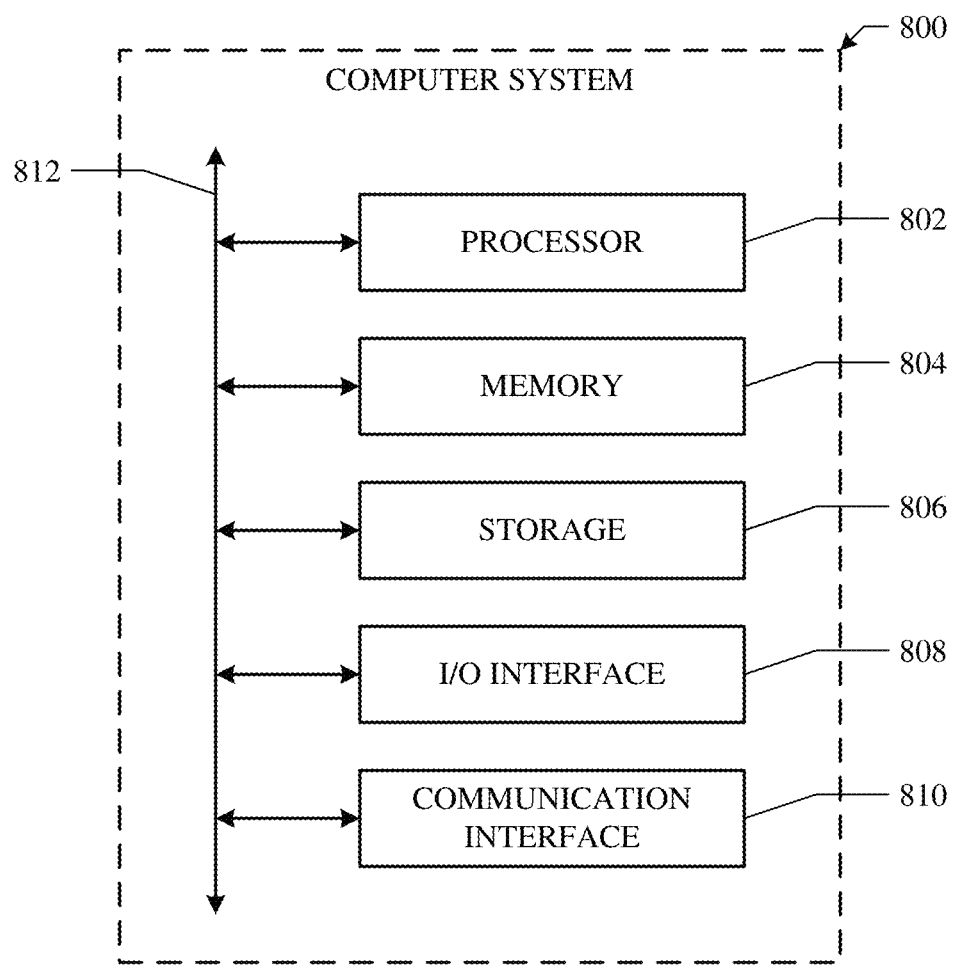
FIG. 8 illustrates an example computer system

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for conducting a model-based chargeback representation comprising:
    acquiring, by a transaction processing system, a record of a chargeback asserted by a customer against a merchant for a transaction, the chargeback being associated with one or more records associated with the transaction;
    determining, by the transaction processing system and using a chargeback representment model trained to predict a probability that a chargeback representment will succeed based on analyzing the one or more records associated with the transaction, a probability that a chargeback representment will succeed for the chargeback and a relative relevance of the one or more records associated with the transaction, wherein the chargeback representment model is a machine learning model;
    training the chargeback representment model by:
    accessing, by the transaction processing system, a plurality of records of chargebacks, wherein the plurality of records includes respective context and characteristics of each chargeback;
    providing, by the transaction processing system, the plurality of records of chargebacks to the chargeback representment model;
    predicting, by the transaction processing system using the chargeback representment model, an outcome of asserting representment for each chargeback in the plurality of records of chargebacks;
    predicting, by the transaction processing system using the chargeback representment model, a relative relevance of the respective context and characteristics of each chargeback;
    receiving, by the transaction processing system, an outcome of a representment associated with one or more of the predicted outcomes; and
    revising, by the transaction processing system, the chargeback representment model based on the received outcome;

providing, by the transaction processing system and based on the relative relevance of the one or more records associated with the transaction, a recommendation to the merchant for improving a probability that a chargeback representment for a subsequent transaction will succeed, wherein the recommendation instructs the merchant to collect additional records that are different from the one or more records during the subsequent transaction;

facilitating, by the transaction processing system, upon determining that the probability that the chargeback representment will succeed satisfies a pre-determined condition, the chargeback representment for the chargeback for the transaction, wherein facilitating the chargeback representment comprises automatically initiating, by the transaction processing system, the chargeback representment on behalf of the merchant based on the probability that the chargeback representment will succeed;

receiving, by the transaction processing system, results of the chargeback representment for the chargeback;

retraining, by the transaction processing system, the chargeback representment model based on the results of the chargeback representment for the chargeback; and providing, by the transaction processing system, the results of the chargeback representment for the chargeback to the merchant, wherein the results of the chargeback representment for the chargeback is communicated to the merchant using an application programming interface.

2. The method of claim 1, wherein facilitating the chargeback representment comprises:

providing, by the transaction processing system to the merchant, a second recommendation regarding the chargeback representment, wherein the second recommendation is associated with the probability that the chargeback representment will succeed; and receiving, by the transaction processing system from the merchant, a request to initiate the chargeback representment.

3. The method of claim 1, wherein the one or more records associated with the transaction comprise one or more of:
purchase patterns associated with a customer involved in the transaction;
characteristics of the customer involved in the transaction;
results of one or more verification checks performed by the transaction processing system or a third-party system;
a merchant category code of the merchant;
a type of goods or services involved in the transaction;
a value of the transaction;
a provided reason for the chargeback;
characteristics of a payment card involved in the transaction;
an amount of time between the transaction and chargeback; or
merchant evidence related to the transaction.

4. One or more computer-readable non-transitory storage media including instructions that, when executed by one or more processors of a transaction processing system, are configured to cause the one or more processors to perform operations comprising:

acquiring, by the transaction processing system, a record of a chargeback asserted by a customer against a merchant for a transaction, the chargeback being associated with one or more records associated with the transaction;

determining, by the transaction processing system and using a chargeback representment model trained to predict a probability that a chargeback representment will succeed based on analyzing the one or more records associated with the transaction, a probability that a chargeback representment will succeed for the chargeback and a relative relevance of the one or more records associated with the transaction, wherein the chargeback representment model is a machine learning model;

training the chargeback representment model by:

accessing, by the transaction processing system, a plurality of records of chargebacks, wherein the plurality of records includes respective context and characteristics of each chargeback;

providing, by the transaction processing system, the plurality of records of chargebacks to the chargeback representment model;

predicting, by the transaction processing system using the chargeback representment model, an outcome of asserting representment for each chargeback in the plurality of records of chargebacks;

predicting, by the transaction processing system using the chargeback representment model, a relative relevance of the respective context and characteristics of each chargeback;

receiving, by the transaction processing system, an outcome of a representment associated with one or more of the predicted outcomes; and revising, by the transaction processing system, the chargeback representment model based on the received outcome;

providing, by the transaction processing system and based on the relative relevance of the one or more records associated with the transaction, a recommendation to the merchant for improving a probability that a chargeback representment for a subsequent transaction will succeed, wherein the recommendation instructs the merchant to collect additional records that are different from the one or more records during the subsequent transaction;

facilitating, by the transaction processing system, upon determining that the probability that the chargeback representment will succeed satisfies a pre-determined condition, the chargeback representment for the chargeback for the transaction, wherein facilitating the chargeback representment comprises automatically initiating, by the transaction processing system, the chargeback representment on behalf of the merchant based on the probability that the chargeback representment will succeed;

receiving, by the transaction processing system, results of the chargeback representment for the chargeback;

retraining, by the transaction processing system, the chargeback representment model based on the results of the chargeback representment for the chargeback; and providing, by the transaction processing system, the results of the chargeback representment for the chargeback to the merchant, wherein the results of the chargeback representment for the chargeback is communicated to the merchant using an application programming interface.

5. The one or more computer-readable non-transitory storage media of claim 4, wherein the instructions to cause the one or more processors of the transaction processing system to facilitate chargeback representment are further configured to cause one or more processors of the transaction processing system to perform further operations comprising:
providing, by the transaction processing system to the merchant, a second recommendation regarding the chargeback representment, wherein the second recommendation is associated with the probability that the chargeback representment will succeed; and
receiving, by the transaction processing system from the merchant, a request to initiate the chargeback representment.

6. The one or more computer-readable non-transitory storage media of claim 4, wherein the one or more records associated with the transaction comprise one or more of:
purchase patterns associated with a customer involved in the transaction;
characteristics of the customer involved in the transaction;
results of one or more verification checks performed by the transaction processing system or a third-party system;
a merchant category code of the merchant;
a type of goods or services involved in the transaction;
a value of the transaction;
a provided reason for the chargeback;
characteristics of a payment card involved in the transaction;
an amount of time between the transaction and chargeback; or
merchant evidence related to the transaction.

7. A transaction processing system comprising: one or more processors; and one or more computer-readable non-transitory storage media in communication with the one or more processors and comprising instructions that, when executed by the one or more of the processors, are configured to cause the transaction processing system to perform operations comprising:
acquiring, by the transaction processing system, a record of a chargeback asserted by a customer against a merchant for a transaction, the chargeback being associated with one or more records associated with the transaction;
determining, by the transaction processing system and using a chargeback representment model trained to predict a probability that a chargeback representment will succeed based on analyzing the one or more records associated with the transaction, a probability that a chargeback representment will succeed for the chargeback and a relative relevance of the one or more records associated with the transaction, wherein the chargeback representment model is a machine learning model;
training the chargeback representment model by:
accessing, by the transaction processing system, a plurality of records of chargebacks, wherein the plurality of records includes respective context and characteristics of each chargeback;
providing, by the transaction processing system, the plurality of records of chargebacks to the chargeback representment model;
predicting, by the transaction processing system using the chargeback representment model, an outcome of asserting representment for each chargeback in the plurality of records of chargebacks;
predicting, by the transaction processing system using the chargeback representment model, a relative relevance of the respective context and characteristics of each chargeback;
receiving, by the transaction processing system, an outcome of a representment associated with one or more of the predicted outcomes; and
revising, by the transaction processing system, the chargeback representment model based on the received outcome;
providing, by the transaction processing system and based on the relative relevance of the one or more records associated with the transaction, a recommendation to the merchant for improving a probability that a chargeback representment for a subsequent transaction will succeed, wherein the recommendation instructs the merchant to collect additional records that are different from the one or more records during the subsequent transaction;
facilitating, by the transaction processing system, upon determining that the probability that the chargeback representment will succeed satisfies a pre-determined condition, chargeback representment for the chargeback for the transaction, wherein facilitating the chargeback representment comprises automatically initiating, by the transaction processing system, the chargeback representment on behalf of the merchant based on the probability that the chargeback representment will succeed;
receiving, by the transaction processing system, results of the chargeback representment for the chargeback;
retraining, by the transaction processing system, the chargeback representment model based on the results of the chargeback representment for the chargeback; and
providing, by the transaction processing system, the results of the chargeback representment for the chargeback to the merchant, wherein the results of the chargeback representment for the chargeback is communicated to the merchant using an application programming interface.

8. The transaction processing system of claim 7, wherein the instructions to cause the transaction processing system to facilitate chargeback representment are further configured to cause the transaction processing system to perform further operations comprising:
providing, by the transaction processing system to the merchant, a second recommendation regarding the chargeback representment, wherein the second recommendation is associated with the probability that the chargeback representment will succeed; and
receiving, by the transaction processing system from the merchant, a request to initiate the chargeback representment.

9. The transaction processing system of claim 7, wherein the one or more records associated with the transaction comprise one or more of:
purchase patterns associated with a customer involved in the transaction;
characteristics of the customer involved in the transaction;
results of one or more verification checks performed by the transaction processing system or a third-party system;
a merchant category code of the merchant;
a type of goods or services involved in the transaction;
a value of the transaction;
a provided reason for the chargeback;

characteristics of a payment card involved in the transaction;

an amount of time between the transaction and chargeback; or merchant evidence related to the transaction.

* * * * *